United States Patent
Iechika et al.

(10) Patent No.: US 7,118,229 B2
(45) Date of Patent: Oct. 10, 2006

(54) ILLUMINATION OPTICAL SYSTEM AND PROJECTOR USING THE SAME

(75) Inventors: Hisashi Iechika, Shiojiri (JP); Takeshi Takizawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 535 days.

(21) Appl. No.: 10/343,939

(22) PCT Filed: Feb. 26, 2002

(86) PCT No.: PCT/JP02/01762

§ 371 (c)(1),
(2), (4) Date: Feb. 5, 2003

(87) PCT Pub. No.: WO02/069018

PCT Pub. Date: Sep. 6, 2002

(65) Prior Publication Data

US 2003/0133078 A1    Jul. 17, 2003

(30) Foreign Application Priority Data

Feb. 27, 2001    (JP) ............................... 2001-52122

(51) Int. Cl.
| | |
|---|---|
| *G03B 21/14* | (2006.01) |
| *G03B 3/00* | (2006.01) |
| *G02F 1/1335* | (2006.01) |
| *G02F 1/00* | (2006.01) |
| *G02B 5/30* | (2006.01) |
| *F21V 9/14* | (2006.01) |
| *H04N 5/74* | (2006.01) |

(52) U.S. Cl. .................... 353/102; 353/20; 353/38; 353/98; 353/100; 349/9; 349/60; 349/95; 349/96; 359/497; 359/500; 362/19; 348/750; 348/759; 348/771

(58) Field of Classification Search ............... 353/102, 353/20, 22, 24, 34, 38, 100, 101, 119, 98, 353/99; 349/57, 58, 60, 5, 7, 8, 9, 95, 96; 359/500, 497; 362/367, 368, 19; 348/744, 348/750, 751, 761, 771, 758, 759
See application file for complete search history.

(56) References Cited

U.S. PATENT DOCUMENTS 5,202,706 A    4/1993    Hasegawa ................... 359/819

(Continued)

FOREIGN PATENT DOCUMENTS

CN    1188907 A    7/1998

OTHER PUBLICATIONS

Dismissal of Amendment.
Notification of Reason for Rejection.

*Primary Examiner*—W. B. Perkey
*Assistant Examiner*—Rochelle Blackman
(74) *Attorney, Agent, or Firm*—Oliff & Berridge, PLC

(57) ABSTRACT

The present invention provides a technique for readily changing the design of a projector. A projector comprises: an illumination optical system; a light modulation device; a projection optical system; and a base frame for mounting a plurality of optical components disposed on a light path from the optical illumination system to the projection optical system. The illumination optical system 300 comprises: a light source 20; a lens array 320; and a superimposing lens system 370. The base frame includes a positioning section for positioning the superimposing lens system 370. The superimposing lens system 370 includes at least two lenses 371 and 372. The first lens 371 is provided at a position nearest to the light source and mainly determines an F-number of the illumination optical system. The second lens 372 is provided at a position furthest from the light source and mainly determines a magnification of the illumination optical system.

20 Claims, 8 Drawing Sheets

U.S. PATENT DOCUMENTS

| | | | |
|---|---|---|---|
| 5,757,559 A | 5/1998 | Nomura et al. | |
| 6,147,802 A | 11/2000 | Itoh et al. | 359/500 |
| 6,310,723 B1 | 10/2001 | Itoh et al. | 359/487 |
| 6,312,130 B1* | 11/2001 | Haba et al. | 353/34 |
| 6,344,927 B1 | 2/2002 | Itoh et al. | 359/487 |
| 6,411,438 B1 | 6/2002 | Itoh et al. | 359/497 |
| 6,417,974 B1 | 7/2002 | Schuster | |
| 6,445,500 B1 | 9/2002 | Itoh | 359/487 |
| 6,667,834 B1 | 12/2003 | Itoh | 359/485 |
| 6,705,735 B1 | 3/2004 | Chang et al. | 353/99 |

FOREIGN PATENT DOCUMENTS

| | | |
|---|---|---|
| EP | 0 825 472 A2 | 2/1998 |
| EP | 0 825 742 A2 | 2/1998 |
| EP | 0 961 153 A1 | 12/1999 |
| JP | 07-191248 A | 7/1995 |
| JP | 08-021938 A | 1/1996 |
| JP | A 10-115799 | 5/1998 |
| JP | A 10-115803 | 5/1998 |
| JP | A 10-161120 | 6/1998 |
| JP | A 11-133351 | 5/1999 |
| JP | A 11-212023 | 8/1999 |
| JP | A 11-242186 | 9/1999 |
| JP | A 2000-347153 | 12/2000 |
| JP | 2001-015431 A | 1/2001 |
| JP | A 2002-23262 | 1/2002 |
| TW | 293882 A | 12/1996 |
| TW | 357281 A | 5/1999 |

* cited by examiner

ILLUMINATION OPTICAL SYSTEM AND PROJECTOR USING THE SAME

TECHNICAL FIELD

The present invention relates to an illumination optical system and a projector using the same.

BACKGROUND ART

FIG. 11 is a schematic explanatory view showing a conventional projector. This projector comprises an illumination optical system 520, a color light separation optical system 530, a relay optical system 540, three liquid crystal panels 550R, 550G and 550B, a cross dichroic prism 560, and a projection optical system 570.

The illumination optical system 520 comprises a light source unit 510, a first and a second lens array 521 and 522, a polarization conversion element 523, and a superimposing lens 524. The first lens array 521 includes a plurality of small lenses for dividing light from the light source 510 into a plurality of light bundles. The second lens array 522 and the superimposing lens 524 form images of each small lens in the first lens array on the liquid crystal panels. Also, the superimposing lens 524 superimposes the light bundles on the liquid crystal panels 550R, 550G and 550B. It should be noted that the polarization direction of the light emitted from the illumination optical system 520 is aligned into one type of direction by the polarization conversion element 523.

Light W emitted from the illumination optical system 520 is separated into the three color lights of red (R), green (G), and blue (B) at the color light separation optical system 530. Each color light R, G and B enters each of the three liquid crystal panels 550R, 550G, 550B through collimating lenses 534, 535, 536 respectively. The blue light B passes through the relay optical system 540 to enter the liquid crystal panel 550B. The liquid crystal panels 550R, 550G and 550B modulate the color lights R, G and B respectively according to given image information. The modulated color lights are combined by the cross dichroic prism 560, and the combined light is projected onto a screen by the projection optical system 570.

The projector comprises a base frame (not illustrated) on which the above optical components are mounted. Each optical component is positioned by means of positioning section such as a concave portion and a convex portion provided in the base frame.

By the way, the optical system and base frame are changed depending on the projector model. For example, the projection optical system and liquid crystal panels are changed depending on the model. The illumination optical system is also changed depending on those changes. Further, the base frame is changed depending on changes to the optical systems in the projector. Namely, a dedicated base frame is conventionally prepared for each model having a different optical system. Because of this, there was the conventional problem that design changes for projectors required time and labor. This problem is not limited to projectors, but is common to other systems having an illumination optical system.

DISCLOSURE OF THE INVENTION

The object of the present invention is thus to solve the drawbacks of the prior art discussed above and to provide a technique for readily changing the design of apparatuses such as a projector having an illumination optical system.

At least part of the above and the other related objects is attained by a first apparatus of the present invention, which is an illumination optical system for illuminating a predetermined illumination area. The illumination optical system includes: a light source; a lens array including a plurality of small lenses for dividing light emitted from the light source into a plurality of light bundles; a superimposing lens system for superimposing the plurality of light bundles on the predetermined illumination area; and a base frame for mounting a plurality of optical components disposed at least on a light path from the lens array to the superimposing lens system, the base frame including a positioning section for positioning at least the superimposing lens system. The superimposing lens system includes at least two lenses including a first lens and a second lens. The first lens is provided at a position nearest to the light source and mainly determines an F-number of the illumination optical system, and the second lens is provided at a position furthest from the light source and mainly determines a magnification of the illumination optical system.

In this illumination optical system, by changing the lenses constituting the superimposing lens system, the F-number and magnification of the illumination optical system can be changed without changing the disposition of the superimposing lens system. Thus, it is possible to use a common base frame with different models, the result of which is that the design of the illumination optical system can be readily changed. Also, in an apparatus such as a projector including this illumination optical system, the design of the apparatus can be readily changed according to the model.

In the above apparatus, it is preferable that the superimposing lens system consists of the two lenses. In this case, the construction of a superimposing lens system is simple, so the design of the superimposing lens system can be readily changed. It should be noted that the superimposing lens system can be constructed by assembling three or more lenses.

In the above apparatus, a mirror for bending a travel direction of light may be disposed between the two lenses. In this case, an apparatus such as a projector including this illumination optical system can be constructed in a compact manner.

In the above apparatus, each lens constituting the superimposing lens system may be attached to the base frame using an elastic member. Alternatively, at least one of the plurality of lenses constituting the superimposing lens system may be attached to the base frame using an elastic member. In this case, it is easy to attach and remove the lenses.

In the above apparatus, at least one of the plurality of lenses constituting the superimposing lens system may be attached to the base frame through a holding frame for holding the lens. In this case, it is easy to attach the lenses to the base frame.

In the above apparatus, it is preferable that a first guiding portion and a second guiding portion for guiding the holding frame to the base frame are provided in the holding frame and the base frame respectively; a predetermined gap is formed between the two guiding portions; and a position for a direction orthogonal to an optical axis of the holding frame is adjusted within the predetermined gap, and a position for a direction of the optical axis of the holding frame is determined by the positioning section. In this case, the position of the direction orthogonal to the optical axis of the lenses constituting the superimposing lens can be adjusted, so when a predetermined illumination area and a lighting area of the illumination optical system are misaligned vertically or horizontally, the lighting area of the illumination optical system can be aligned with the available display area of the liquid crystal panel.

In the above apparatus, it is preferable that the at least one lens attached to the base frame through the holding frame includes the second lens. The second lens positioned at the furthest position from the light source has the function to ultimately determine the formation position of the lighting area of the illumination optical system. It is thus possible to align the lighting area of the illumination optical system to a predetermined illumination area relatively easily.

In the above apparatus, a polarization conversion element for aligning a polarization direction of light emitted from the illumination optical system may be provided between the lens array and the superimposing lens system. In this case, the polarization direction of the light emitted from the illumination optical system can be aligned. When a projector includes this illumination optical system, it is possible to use light effectively.

The present invention is also directed to a second apparatus, which is a projector that includes: an illumination optical system; a light modulation device for modulating light given from the illumination optical system according to image information; a projection optical system for projecting the modulated light; and a base frame for mounting a plurality of optical components disposed on a light path from the optical illumination system to the projection optical system. The illumination optical system comprises: a light source; a lens array including a plurality of small lenses for dividing light emitted from the light source into a plurality of light bundles; and a superimposing lens system for superimposing the plurality of light bundles on the light modulation device. The base frame includes a positioning section for positioning at least the superimposing lens system. The superimposing lens system includes at least two lenses including a first lens and a second lens. The first lens is provided at a position nearest to the light source and mainly determines an F-number of the illumination optical system, and the second lens is provided at a position furthest from the light source and mainly determines a magnification of the illumination optical system.

This projector includes an illumination optical system which is the first apparatus of the present invention. The design of the projector can thus be readily changed according to the model. It should be noted that the light modulation device may be a liquid crystal panel.

The present invention is also directed to a third apparatus, which is an illumination optical system for illuminating a predetermined illumination area. The illumination optical system includes: a light source; a lens array including a plurality of small lenses for dividing light emitted from the light source into a plurality of light bundles; and a superimposing lens system for superimposing the plurality of light bundles on the predetermined illumination area. The superimposing lens system includes a plurality of lenses, the plurality of lenses being disposed so as to be replaceable with lenses having different focal lengths.

In this illumination optical system, as with the first apparatus of the present invention, the lenses constituting the superimposing lens system are disposed so as to be replaceable, so the design of the illumination optical system can be readily changed according to the model. Also, if an apparatus such as a projector includes the illumination optical system, the design of the apparatus can be readily changed according to the model.

BEST MODES OF CARRYING OUT THE INVENTION

A. FIRST EMBODIMENT

Figure 1:
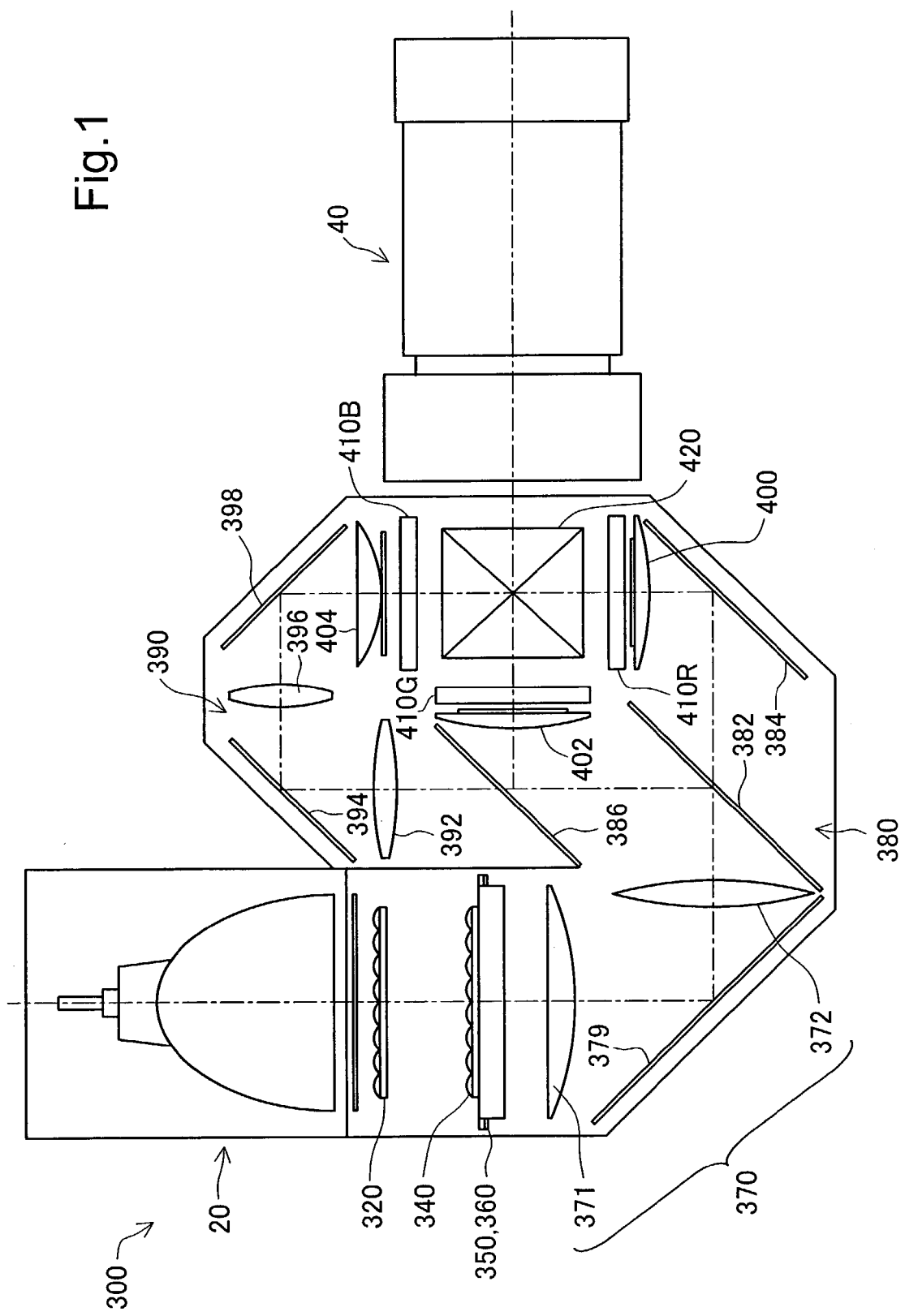
FIG. 1 is an explanatory view showing a projector (projection display apparatus) to which the present invention has been applied.

A-1. Entire Construction of Projector:

One mode of carrying out the present invention is discussed below as a preferred embodiment. FIG. 1 is an explanatory view showing a projector (projection display apparatus) to which the present invention has been applied. The projector comprises an illumination optical system 300, a color light separation optical system 380, a relay optical system 390, three liquid crystal panels 410R, 410G and 410B, a cross dichroic prism 420, and a projection optical system 40.

Figure 2:
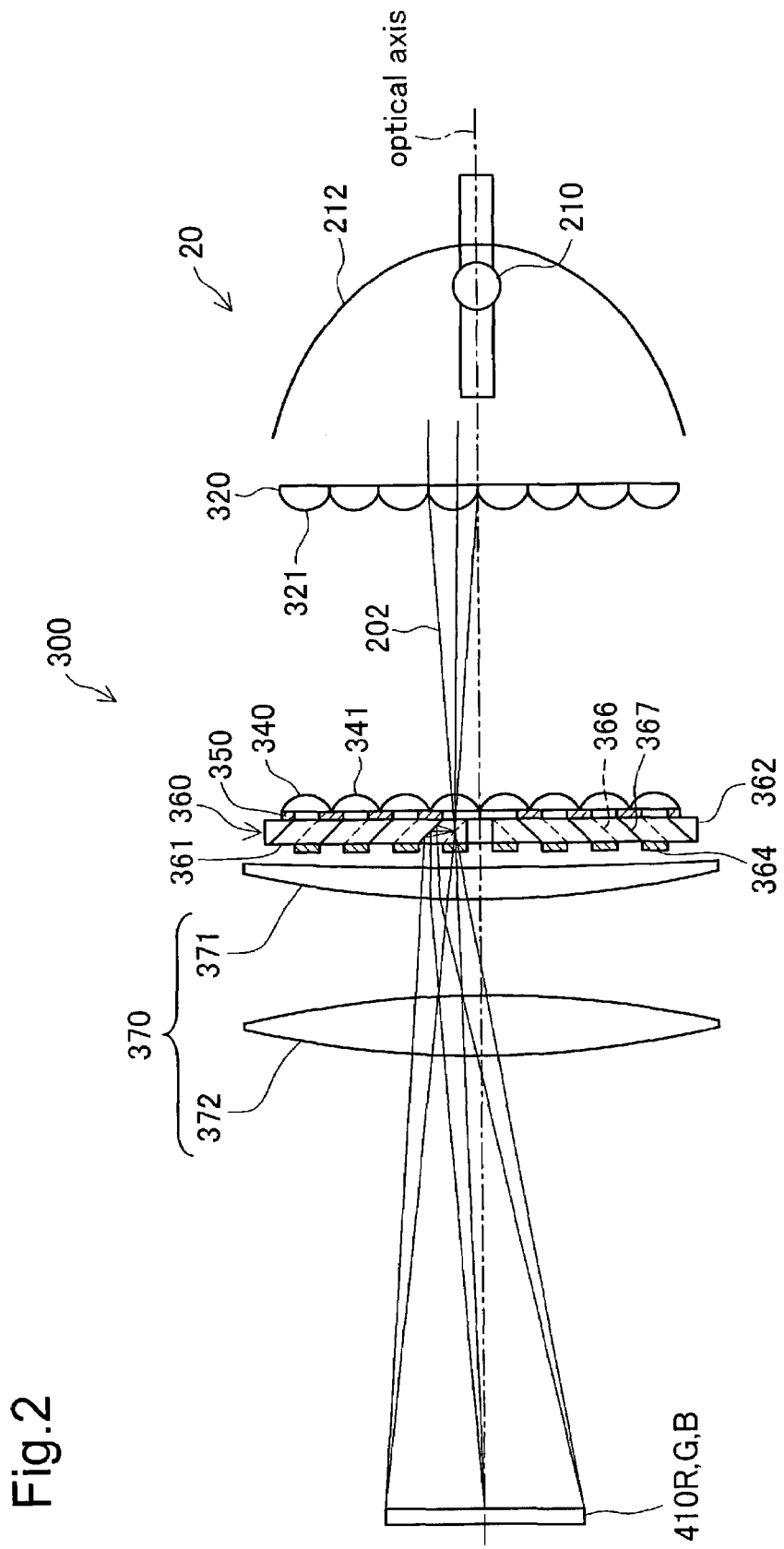
FIG. 2 is an explanatory view showing an illumination optical system 300 indicated in FIG. 1 magnified.

FIG. 2 is an explanatory view showing the illumination optical system 300 shown in FIG. 1 magnified. The illumination optical system 300 comprises a light source unit 20, a first and a second lens array 320 and 340, a shading plate 350, a polarization conversion element array 360, and a superimposing lens system 370.

The light source unit 20 includes a light source lamp 210 and a concave mirror 212. Light emitted radially (radial light) from the light source lamp 210 is reflected by the concave mirror 212. The reflected light is emitted towards the first lens array 320 as substantially parallel light bundle. A halogen lamp, metal halide lamp or high pressure mercury lamp may be used as the light source lamp 210. A parabolic mirror may be used as the concave mirror 212.

Figure 3A:
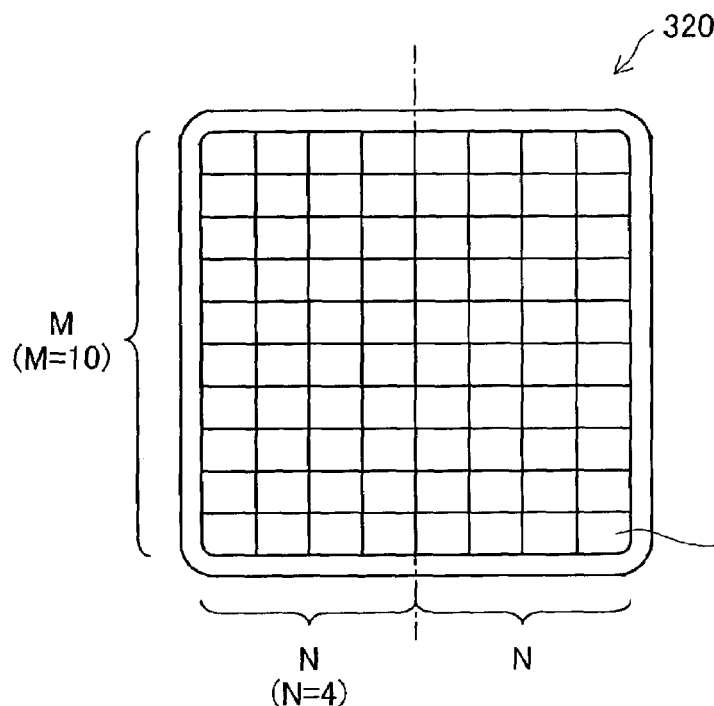
FIGS. 3(A) and 3(B) are explanatory views showing the outside of a first lens array 320.
Figure 3B:
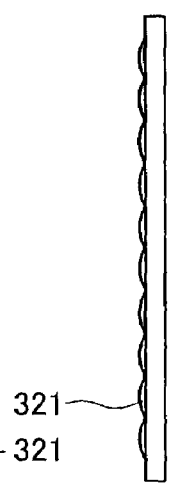

The first lens array 320 has the function of dividing the substantially parallel light bundle emitted from the light source unit 20 into a plurality of partial light bundles. FIGS. 3(A) and 3(B) are explanatory views showing the outside of the first lens array 320. FIG. 3(A) is a front view, and FIG. 3(B) is a side view. The first lens array 320 has a plurality of rectangle small lenses 321 disposed in a matrix of 2×N columns (here, N=4) in the vertical direction and M rows (here, M=10) in the horizontal direction. The external shape of each small lens 321 seen from the light traveling direction is substantially similar to the external shape of the liquid crystal panel 410R, 410G, 410B as an illumination area (illuminated area). For example, when the aspect ratio (the ratio of the horizontal and vertical dimensions) of the available display area (image formation area) in the liquid crystal panel is 4:3, the aspect ratio of each small lens 321 is set to 4:3 as well.

Along with the superimposing lens system 370, the second lens array 340 (FIG. 2) has the function of forming images from each small lens in the first lens array on the liquid crystal panels. The second lens array 340 is substantially same with the first lens array 320, and has the same number of small lenses 341 as the number of small lenses constituting the first lens array 320. The first and second lens arrays 320 and 340 are referred to as integrator lenses.

The polarization conversion element array 360 (FIG. 2) includes two partial polarization conversion element arrays 361 and 362. The two partial polarization conversion element arrays (hereinafter, referred to simply as "partial element arrays") are disposed so as to be mutually opposing about the optical axis. It should be noted that the following description is given focusing on the first partial element array 361, but the second partial element array 362 is similar.

Figure 4:
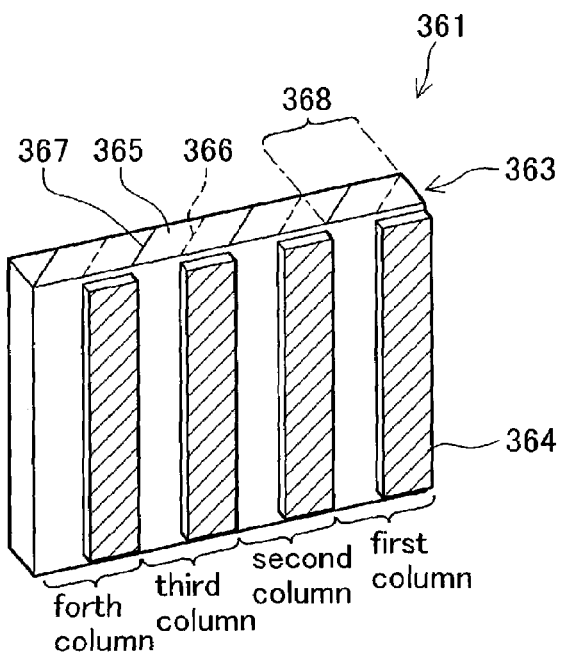
FIG. 4 is a perspective view showing the outside of a first partial polarization conversion element array 361.

FIG. 4 is a perspective view showing the outside of the first partial polarization conversion element array 361. The first partial element array 361 includes a polarization beam splitter array 363, and a λ/2 retardation plate 364 (λ is the wavelength of the light) selectively disposed on the light exiting face of the polarization beam splitter array 363. The polarization beam splitter array 363 is formed by joining a plurality of columnar transmissive members 365 with a parallelogram cross-section placed. A polarization splitting film 366 and a reflecting film 367 are formed alternately at the boundary face of each transmissive member 365. The λ/2 retardation plates 364 are selectively attached to areas corresponding to the polarization splitting films 366.

Figure 5:
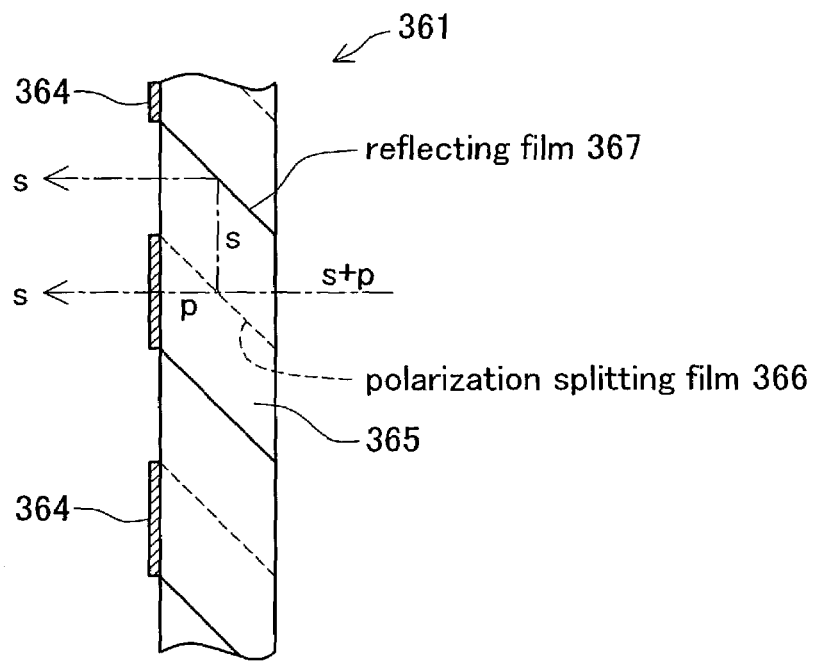
FIG. 5 is an explanatory view showing a part of the first partial polarization conversion element array 361 shown in FIG. 4 magnified.

The partial element array 361 has the function of converting non-polarized incident light into one type of linearly polarized light (s-polarized light or p-polarized light) and then emitting the linearly polarized light. FIG. 5 is an explanatory view showing a part of the first partial polarization conversion element array 361 shown in FIG. 4 magnified. Non-polarized light (the light having random polarization directions) including s-polarization component and p-polarization component enters the light incident surface of the partial element array 361. The non-polarized light is separated into s-polarized light and p-polarized light by the polarization splitting film 366. The s-polarized light is reflected by the polarization splitting film 366, reflected again by the reflecting film 367, and then emitted. The p-polarized light, on the other hand, passes through the polarization splitting film 366, is converted to s-polarized light by the λ/2 retardation plate 364, and then emitted. Thus, only s-polarized light is emitted from the partial element array 361. To emit only p-polarized light from the partial element array 361, λ/2 retardation plates 364 may be selectively disposed in areas corresponding to the reflecting films 367. Also, a λ/4 retardation plate may be used in place of the λ/2 retardation plate 364 to align the direction of polarization. Also, appropriate retardation plates may be provided at the exiting face for the p-polarized light and the exiting face for the s-polarized face to align the direction of polarization.

As shown in FIG. 4, a block including one set of adjacent polarization splitting film 366 and reflecting film 367 as well as one λ/2 retardation plate 364 may be considered one polarization conversion element 368. The first partial polarization conversion element array 361 is constructed by disposing a plurality of these polarization conversion elements 368 orthogonal to the light traveling direction.

Figure 6:
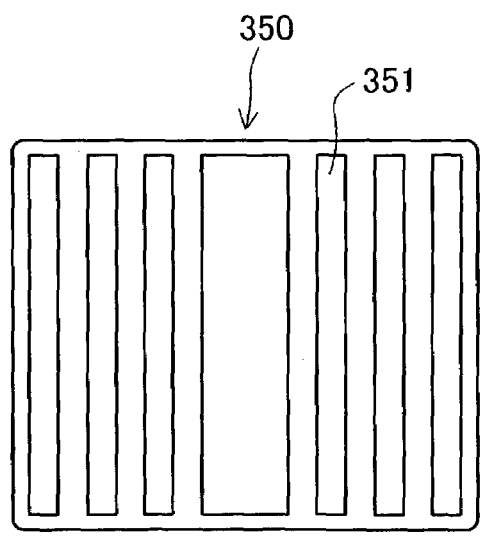
FIG. 6 is a front view showing a shading plate 350.

The shading plate 350 (FIG. 2) has the function of allowing light to enter only areas in the incident surface of the polarization conversion element array 360 that correspond to the polarization splitting films 366. FIG. 6 is a front view showing the shading plate 350. The shading plate 350 is constructed by providing a plurality of openings 351 in the substantially rectangle shaped plate.

The superimposing lens system 370 (FIG. 2) includes two lenses 371 and 372 disposed at a predetermined distance, and has the function of causing a plurality of partial light bundles emitted from the polarization conversion element array 360 to be superimposed on the liquid crystal panels 410R, 410G and 410B. As shown in FIG. 1, in the illumination optical system 300 of this embodiment, a mirror 379 is disposed between the first lens 371 and the second lens 372. The mirror 379 causes light emitted from the first lens 371 to bend at substantially a right angle, and leads it toward the color light separation optical system 380. In this manner, the mirror 379 is used to construct a projector in a compact manner. If bending the light traveling direction is not necessary, the mirror 379 will be omitted.

As described above, substantially parallel light bundle emitted from the light source 20 are divided into a plurality of partial light bundles 202 by the first lens array 320. Then, each of the partial light bundles 202 passes through the second lens array 340, and is focused in the vicinity of the polarization splitting film 366 of the polarization conversion element array 360. The plurality of partial light bundles entering the polarization conversion element array 360 are converted to one type of linearly polarized light and then emitted. The plurality of partial light bundles emitted from the polarization conversion element array 360 are superimposed on the liquid crystal panels 410R, 410G and 410B by the superimposing lens system 370. In this embodiment, light emitted from the illumination optical system is aligned in one type of polarization direction, so it is possible to use the light effectively in the liquid crystal panels.

The color light separation optical system 380 (FIG. 1) includes two dichroic mirrors 382, 386 and a reflecting mirror 384, and has the function of separating light emitted from the illumination optical system 300 into the three color lights of red, green and blue. The first dichroic mirror 382 allows the red component from the light emitted from the illumination optical system 300 to pass through, while reflecting the blue component and the green component. The red light passing through the first dichroic mirror 382 is reflected by the reflecting mirror 384, and passes through a collimating lens 400 to reach the liquid crystal panel 410R for red light. The collimating lens 400 has the function of converting each partial light bundle emitted from the illumination optical system 300 into a partial light bundle parallel to the principal ray (center ray). Collimating lenses 402 and 404 provided at the light incident surface of the other liquid crystal panels 410G and 410B are similar.

Of the light which includes the blue component and the green component reflected by the first dichroic mirror 382, the green light reflected by the second dichroic mirror 386 passes through the collimating lens 402 to reach the liquid crystal panel 410G for green light. The blue light, on the other hand, which passes through the second dichroic mirror 386, passes through the relay optical system 390, or more specifically, the incident side lens 392, the first reflecting mirror 394, the relay lens 396 and the second reflecting mirror 398, then further passes through the collimating lens 404 to reach the liquid crystal panel 410B for blue light. The relay optical system is provided to prevent the optical efficiency of the blue light from decreasing due to light diverging.

The three liquid crystal panels 410R, 410G, 410B are light modulation devices (light modulation elements) having the function of modulating light according to given image information (image signals). Each color light entering each of the three liquid crystal panels is modulated according to the given image information, and an image is formed in each color. It should be noted that polarizing plates not illustrated are provided at the light incident side and the light exiting side of each liquid crystal panel. A set of a liquid crystal panel and two polarizing plates is referred to as a liquid crystal light valve.

The three modulated color lights emitted from the three liquid crystal panels 410R, 410G, 410B enter the cross dichroic prism 420. The cross dichroic prism 420 combines the three modulated color lights and generates a combined light showing a color image. In other words, the cross dichroic prism 420 functions as a color light combining prism. The combined light is emitted in the direction of an entrance pupil of the projection optical system 40.

The projection optical system 40 is an assembly having a plurality of lenses. The projection optical system 40 projects the combined light obtained by the cross dichroic prism 420 onto a screen. A color image is thereby displayed on the screen.

As mentioned above, the projector comprises a plurality of optical components (optical elements). The projector also comprises a base frame (referred to also as a "light guide") for mounting the plurality of optical components. The positioning of each of the plurality of optical components is determined by a convex portion or a concave portion provided in the base frame. The base frame will be described later.

Figure 11:
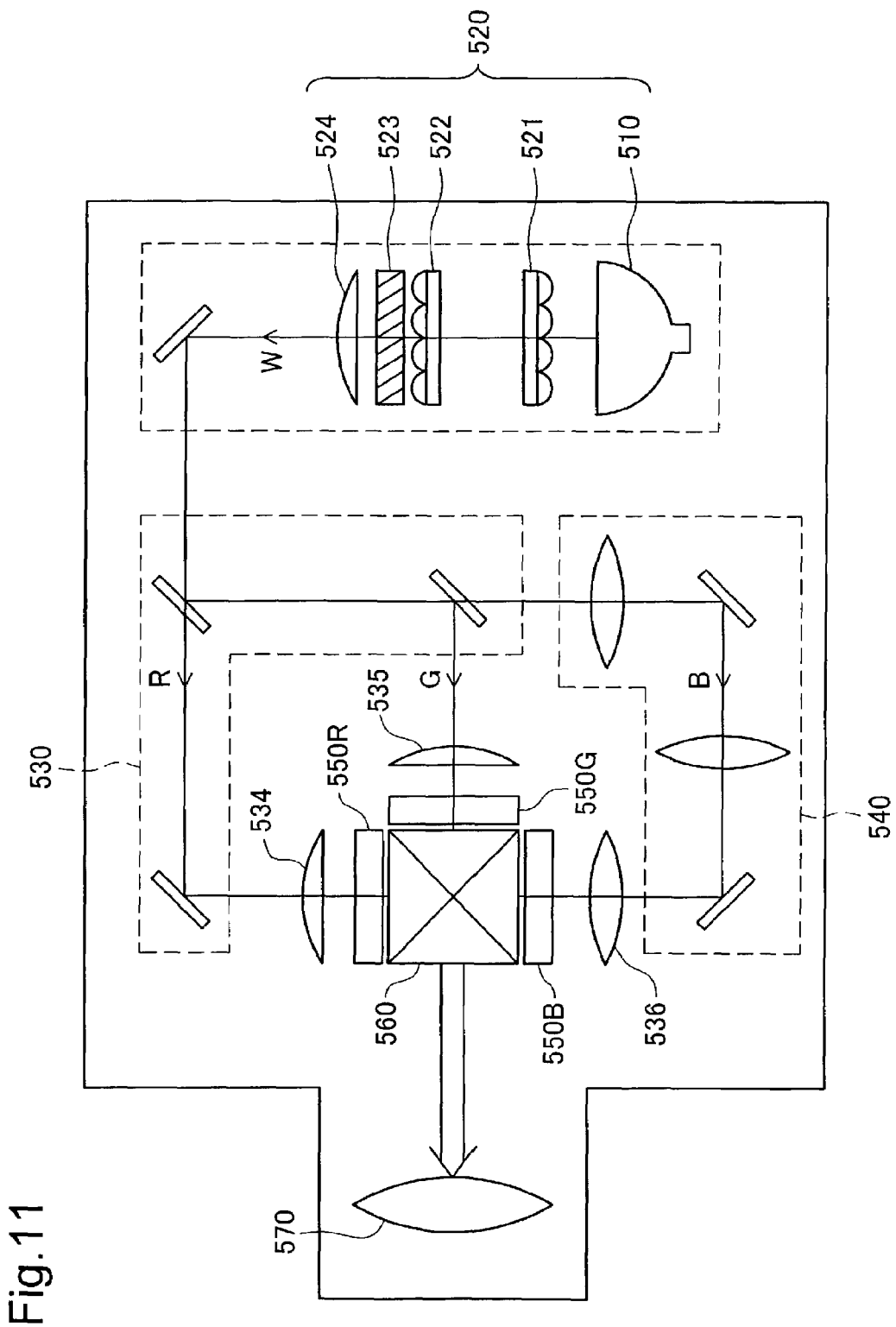
FIG. 11 is a schematic explanatory view showing the conventional projector.

A-2. Design of Illumination Optical System:

As described above, the optical system of a projector is changed depending on the projector model. For example, the projection optical system and the liquid crystal panels are changed depending on the model. And with that change, the F-number and magnification of the illumination optical system change. Conventionally, the base frame is also changed when there is a change in the optical system of the projector. More specifically, conventionally, a dedicated base frame is prepared for each model having a different optical system. In this manner, a dedicated base frame is needed in a conventional projector, because the superimposing lens system comprises only one superimposing lens 524 as shown in FIG. 11. In other words, when the F-number and magnification of the illumination optical system are changed, the curvature of the superimposing lens 524 needs to be changed as well as its disposition. However, in a base frame where the layout of many optical components is already decided, it is difficult to change the disposition of the superimposing lens 524 without interfering with the other optical components. In this manner, there is an extremely low degree of freedom to change the design of a conventional projector.

In the projector of this embodiment, the superimposing lens system comprises two lenses 371 and 372, thereby improving the degree of freedom to change the design. Concretely, it is possible to change the F-number or magnification of the illumination optical system without changing the position of the lenses constituting the superimposing lens system. It is thus possible to use a common base frame for different models, and as a result, the design of the projector can be readily changed.

Figure 7:
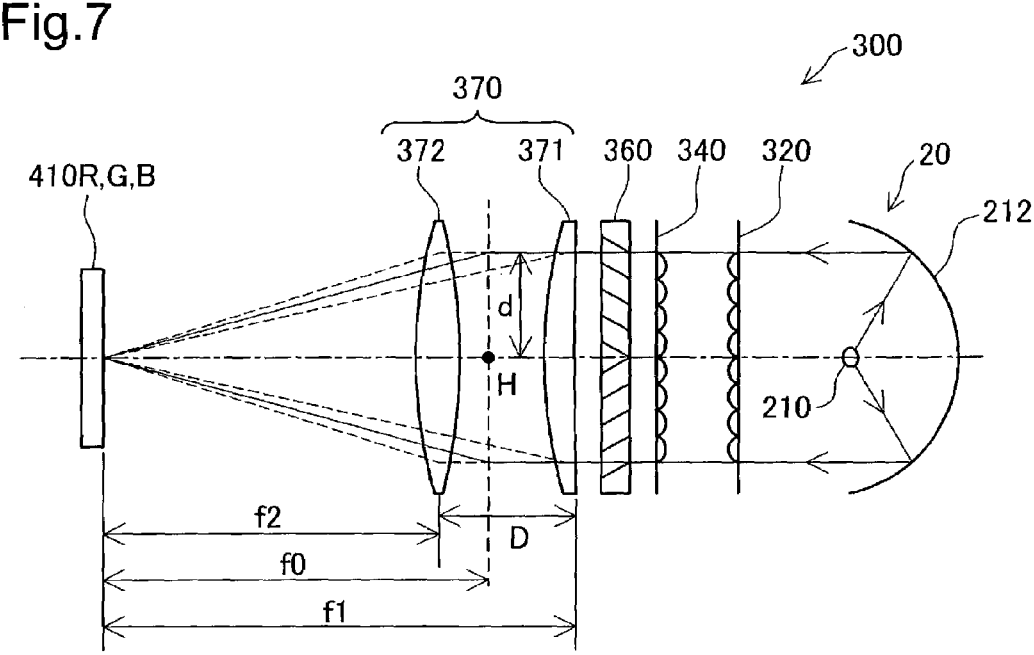
FIG. 7 is an explanatory view showing a model of the function of a superimposing lens system 370.

FIG. 7 is an explanatory view showing a model of the function of the superimposing lens system 370. As illustrated, the two lenses constituting the superimposing lens system 370 are provided separated by a predetermined distance D.

The F-number of the illumination optical system 300 is represented by about $f0/(2\times d)$. Here, "f0" is the distance from the principal point (second principal point) H of the superimposing lens system 370 to the focal point in image space (liquid crystal panels 410R, 410G, 410B). "$2\times d$" is the dimension (width) of the light bundle and is determined by the light source unit 20. More specifically, the superimposing lens system 370 constituted of the two lenses 371 and 372 is equivalent to a hypothetical lens (condenser lens) having one focal length f0, provided between the two lenses.

For example, if the surface of the second lens 372 is assumed to be flat having a curvature of zero, the position of the hypothetical lens will be that of the first lens 371. In this case, the F-number of the illumination optical system will be represented by about f1/(2×d). It should be noted that "f1" is the distance from the first lens 371 to the liquid crystal panels 410R, 410G and 410B, and is the focal length of the first lens 371 in this hypothetical example. On the other hand, if the surface of the first lens 371 is assumed to be flat having a curvature of zero, the position of the hypothetical lens will be that of the second lens 372. In this case, the F-number of the illumination optical system will be represented by about f2/(2×d). It should be noted that "f2" is the distance from the second lens 372 to the liquid crystal panels 410R, 410G and 410B, and is the focal length of the second lens 372 in this hypothetical example.

As will be appreciated from the above description, the position of the hypothetical lens can be set to a desired position between the two lenses 371 and 372 by changing the curvature of the surface of the two lenses 371 and 372. In other words, by changing the focal lengths of the two lenses 371 and 372, it is possible to set the F-number of the illumination optical system to a desired value without changing the disposition of the two lenses. When employing a negative lens, the position of the hypothetical lens may be set to a position external to the two lenses.

Below, cases are described where the projection optical system and the liquid crystal panels are changed according to the model.

(a) When changing the F-number of the projection optical system 40 according to the model, the F-number of the illumination optical system 300 also needs to be changed. Namely, the F-number of the projection optical system 40 is set nearly the same as the F-number of the illumination optical system 300 or therebelow. In this case, the projection optical system has an aperture nearly equivalent to or higher than the illumination optical system 300.

When the F-number of the projection optical system 40 is decreased, the F-number of the illumination optical system 300 is also decreased. Specifically, the focal length of the first lens 371 constituting the superimposing lens system 370 is set to a relatively large value. The focal length of the second lens 372 is preferably set to a relatively small value. In this case, the position of the hypothetical lens will be set relatively near the liquid crystal panels, and the F-number of the illumination optical system will be set small.

It should be noted that the focal length of a lens can be adjusted by changing the refractive index or the curvature of the lens. For example, when setting the focal length of a lens relatively short, the refractive index of the lens will be made large or the curvature (=1/radius) of the lens will be made large.

(b) When the structure of the liquid crystal panels 410R, 410G and 410B is changed according to the model, it is necessary to change the F-number of the illumination optical system 300. The liquid crystal panels may be internally equipped with micro-lenses to increase the amount of light passing through.

When the liquid crystal panels include micro-lenses, the F-number of the illumination optical system 300 is set relatively large. Specifically, the focal length of the first lens 371 is set to a relatively small value. The focal length of the second lens 372 is preferably set to a value larger than the focal length of the first lens 371. In this case, the position of the hypothetical lens will be set relatively far from the liquid crystal panels, and the F-number of the illumination optical system will be set large. As a result, the aperture of the illumination optical system can be constrained while diffusion of light is prevented from occurring in the micro-lenses.

When the liquid crystal panels do not include micro-lenses, on the other hand, the F-number of the illumination optical system 300 is set relatively small. Specifically, the focal length of the first lens 371 is set to a relatively large value. The focal length of the second lens 372 is preferably set to a value smaller than the focal length of the first lens 371. In this case, the position of the hypothetical lens will be set relatively near the liquid crystal panels, and the F-number of the illumination optical system will be set small. As a result, the liquid crystal panels can use illumination light effectively.

(c) When the size of the liquid crystal panels is changed according to the model, it is necessary to change the magnification of the illumination optical system 300. Here, the magnification of the illumination optical system 300 means the ratio of the size of the liquid crystal panel 410R, 410G, 410B to the small lens 321 of the first lens array 320. When the focal length of the small lens 321 of the first lens array is fa, the magnification is represented by about f0/fa.

When the size of the liquid crystal panels is increased, the magnification of the illumination optical system 300 also needs to be increased. Specifically, the focal length of the second lens 372 is set to a relatively large value. The focal length of the first lens 371 is preferably set to a relatively small value. On the other hand, when the size of the liquid crystal panels is decreased, the magnification of the illumination optical system 300 also needs to be decreased. Specifically, the focal length of the second lens 372 is set to a relatively small value. The focal length of the first lens 371 is preferably set to a relatively large value.

It should be noted that when the size of the liquid crystal panels is changed according to the model, the focal length of each lens constituting the superimposing lens system 370 may be changed, and the magnification of the illumination optical system may also be changed by changing the size and the focal length of the small lenses 321 in the first lens array 320.

In this manner, when the F-number of the illumination optical system 300 is changed, the focal length of the first lens 371 provided at a position relatively near the light source unit 20 is mainly changed. Also, when the magnification of the illumination optical system 300 is changed, the focal length of the second lens 372 provided at a position relatively far from the light source unit 20 is mainly changed. This is because the first lens 371 has a higher ability than the second lens 372 to change the F-number of the illumination optical system 300, and the second lens 372 has a higher ability than the first lens 371 to change the magnification of the illumination optical system 300. In other words, the first lens 371 provided at a position relatively near the light source 20 has the function to mainly determine the F-number of the illumination optical system, and the second lens 372 provided at a relatively far position has the function to mainly determine the magnification of the illumination optical system.

Figure 8:
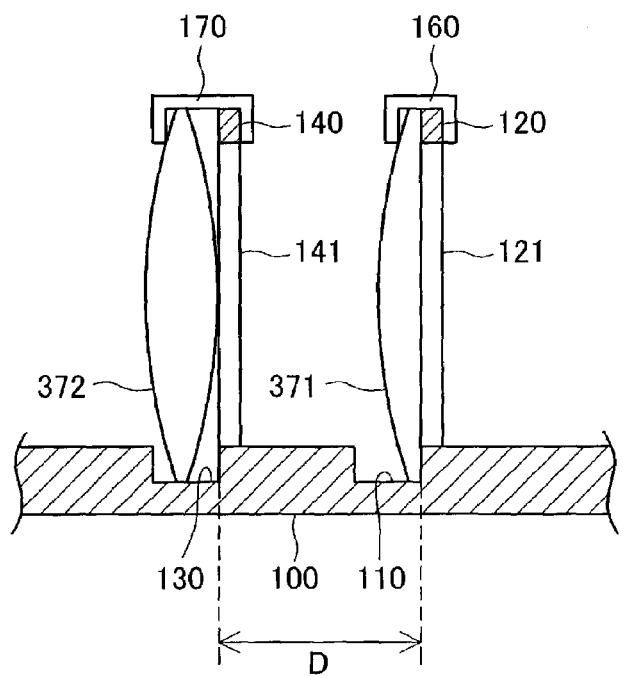
FIG. 8 is an explanatory view showing the condition when the superimposing lens system 370 is mounted on a base frame.

FIG. 8 is an explanatory view showing the condition when the superimposing lens system 370 is mounted on the base frame. As illustrated, in this embodiment, the two lenses 371 and 372 constituting the superimposing lens system 370 are fixed inside the cabinet of the projector to the base frame 100 so as to be attachable and detachable. Concretely, the base frame 100 is provided with two grooves 110, 130 and two erect walls 120, 140 as positioning sections to position the two lenses 371, 372. The distance between the two grooves 110, 130 and the distance between the two erect walls 120, 140 are set to a predetermined distance D (FIG. 7). The first lens 371 is fixed by an elastic clip 160 holding the erect wall 120 and the first lens 371. Similarly, the second lens 372 is fixed by an elastic clip 170 holding the erect wall 140 and the second lens 372. The erect walls 120, 140 have openings 121, 141 to allow light to pass through.

In this manner, the elastic force of elastic member is used to mount the lenses 371, 372 constituting the superimposing lens system 370 to the base frame 100 so as to be attachable and detachable, thereby allowing the lenses 371, 372 to be replaced by lenses having a different focal length (having a different curvature).

As described above, a projector of this embodiment comprises an illumination optical system 300, liquid crystal panels 410R, 410G, 410B for modulating light provided by the illumination optical system according to image information, a projection optical system 40 for projecting the modulated light, and a base frame 100 on which the plurality of optical components on the light path from the illumination optical system to the projection optical system are disposed. The illumination optical system 300 comprises a light source unit 20, a first lens array 320 including a plurality of small lenses 321 for dividing light emitted from the light source unit into a plurality of light bundles; and a superimposing lens system 370 for superimposing the plurality of light bundles on the liquid crystal panels. The base frame 100 includes positioning sections such as grooves 110, 130 and erect walls 120, 140 for positioning the superimposing lens system. The superimposing lens system 370 consists of two lenses 371 and 372, and the first lens 371 is provided at a position relatively near the light source unit 20 mainly to determine the F-number of the illumination optical system, and the second lens 372 is provided at a position relatively far from the light source unit 20 mainly to determine the magnification of the illumination optical system.

In this embodiment, the plurality of optical components disposed on the light path from the illumination optical system to the projection optical system are mounted on the base frame 100, but instead, a partial base frame may be used for mounting only the illumination optical system. In this case, the plurality of optical components disposed at least on the light path from the first lens array to the superimposing lens system are mounted on the partial base frame. The partial base frame is then mounted on the overall base frame.

In a projector such as mentioned above, the focal length of the lenses constituting the superimposing lens system may be changed according to changes in the projection optical system and liquid crystal panels, so that the F-number and the magnification of the illumination optical system 300 can be changed without changing the disposition of the superimposing lens system 370. Accordingly, it is possible to use a common base frame for different models, and as a result, the design of the projector can be readily changed. There is also the advantage that the size of the optical system of the projector overall need not be changed for changes in the illumination optical system.

In a conventional projector, the superimposing lens system consists of only one lens. In this case, the lens tends to be thicker. When the lens is thicker, a misalignment of the displayed image sometimes occurs due to an aberration. However, in this embodiment, the superimposing lens system consists of two relatively thin lenses, so the aberration is small, and misalignment of the displayed image can be decreased.

Also, regardless of the fact that the magnification of the illumination optical system is determined such that the entire available display area of the liquid crystal panel is lighted, in actuality, a so-called display shadow occurs without the entire available display area being lighted. In such cases, the magnification of the illumination optical system can be changed by changing the F-number of the illumination optical system to adjust the light so as to enter the entire available display area of the liquid crystal panels. Namely, it is possible to substantially change the magnification of the illumination optical system by changing the F-number of the illumination optical system.

B. SECOND EMBODIMENT

Figure 9:
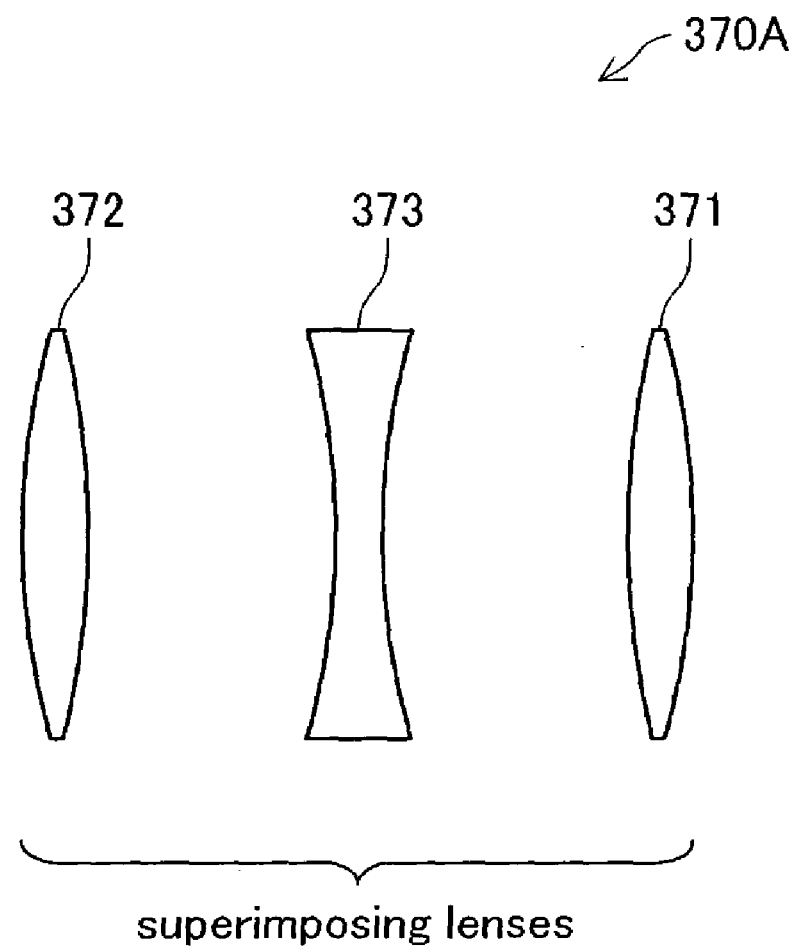
FIG. 9 is an explanatory view showing a superimposing lens system 370A in the second embodiment.

FIG. 9 is an explanatory view showing a superimposing lens system 370A in the second embodiment. This superimposing lens system 370A consists of three lenses. Specifically, a third lens (concave lens) 373 is added between the two lenses 371, 372 of the first embodiment. In this manner, it is possible to construct the superimposing lens system 370A with three or more lenses. In general, at least two lenses should be included in the superimposing lens system. Constructing the superimposing lens system with two lenses as in the first embodiment has the advantage that because the construction is simple, the design of the superimposing lens system can be easily changed.

When the superimposing lens system comprises three or more lenses, it is preferable to provide the first lens mainly for determining the F-number of the illumination optical system at the position nearest the light source unit and to provide the second lens mainly for determining the magnification of the illumination optical system at the position furthest from the light source unit.

Also, it is preferable if each lens constituting the superimposing lens system is provided so as to be attachable to and detachable from the base frame so they can be readily replaced.

C. THIRD EMBODIMENT

In the first embodiment, the lenses 371 and 372 constituting the superimposing lens system 370 are directly mounted on the base frame 100, but instead, they may be mounted using a holding frame.

Figure 10:
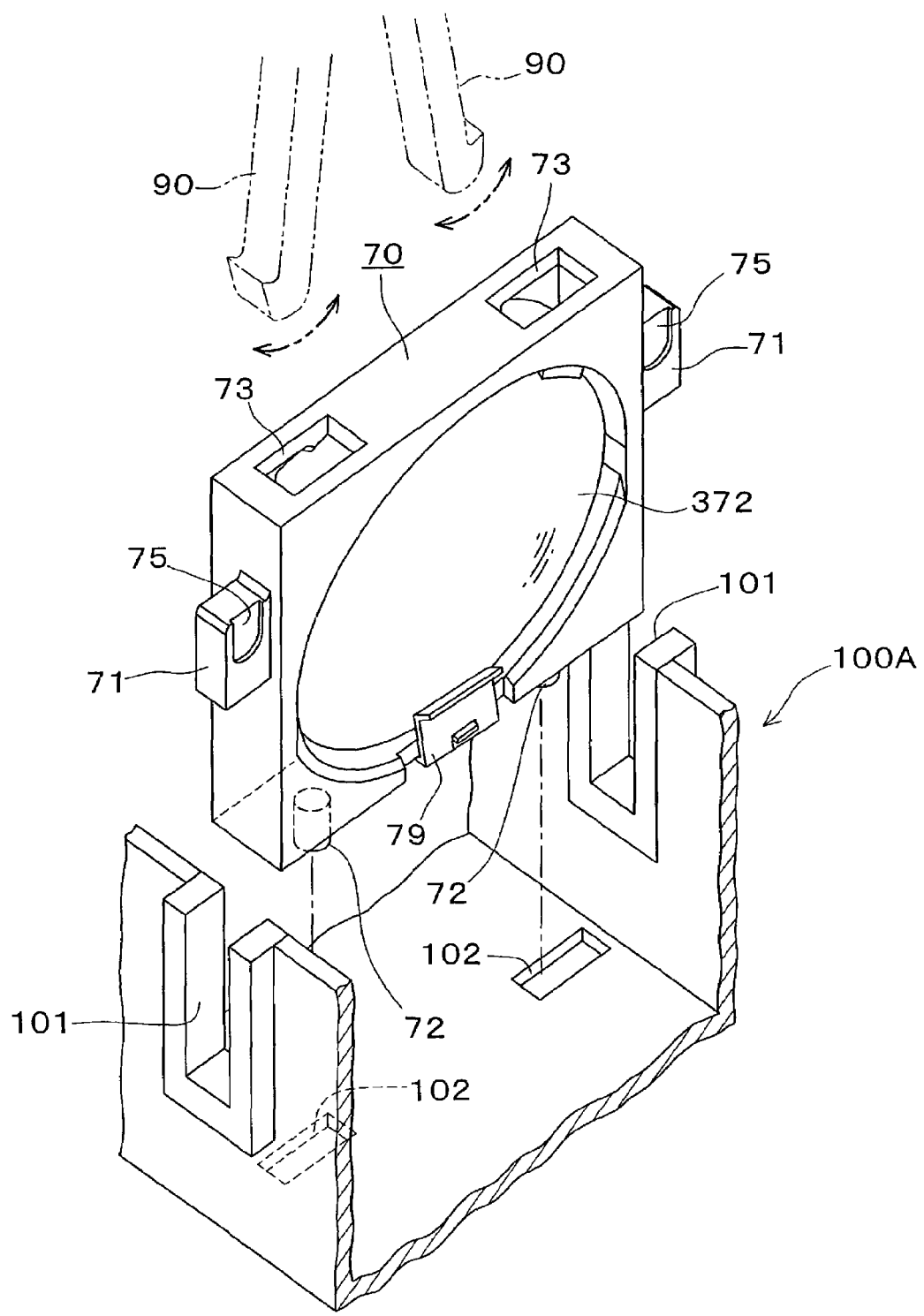
FIG. 10 is an explanatory view showing the condition when a second lens 372 is mounted on a base frame using a holding frame.

FIG. 10 is an explanatory view showing the condition of the second lens 372 mounted on the base frame using a holding frame. As illustrated, the second lens 372 is held by a holding frame 70. Concretely, the circumferential edge of the second lens 372 is fitted into the holding frame 70, and the bottom is held by a clip 79.

Engaging portions (first guiding portions) 71 are provided on both side faces of the holding frame 70 to guide the holding frame 70 in the base frame 100A. Corresponding thereto, two catching portions (second guiding portions) 101 for engaging with the two engaging portions 71 on the holding frame 70 are formed on the base frame 100A. The catching portions 101 are formed in a slit shape opening upward. The engaging portions 71 are inserted inside the catching portions 101 from above, and play (a gap) is formed between the engaging portions 71 and the catching portions 101. Specifically, play is formed in the vertical direction and the horizontal direction (in other words, directions orthogonal to the optical axis) between the engaging portions 71 and the catching portions 101. No play is provided in the lateral direction (in other words, in the direction of the optical axis) between the engaging portions 71 and the catching portions 101. It is desirable to set the dimensions of play to ±1 mm through ±2 mm in the horizontal direction.

Two columnar convex portions 72 are provided on the underside face of the holding frame 70. Corresponding thereto, two long holes 102 for engaging the two convex portions 72 on the holding frame 70 are provided on the bottom face of the base frame 100A. The short sides of the long hole 102 are set up in the direction of the optical axis, and the long sides are set up in the direction orthogonal to the optical axis. The dimension of the short side of the long hole 102 is set nearly equivalent to the diameter dimension of the columnar convex portions 72.

Two holes 73 making handling of the holding frame possible with a jig are provided at the top face of the holding frame 70. The tips of a pair of claws 90 constituting the jig are inserted into the two holes 73 respectively. The jig can grasp and release the holding frame 70 by widening and narrowing the tips of the pair of claws 90.

When the holding frame 70 is mounted on the base frame 100A by means of the jig, the engaging portions 71 of the holding frame 70 engage the catching portions 101 of the base frame 100A, and the convex portions 72 of the holding frame 72 engage the long holes 102 of the base frame 100A. At this time, the holding frame 70 (the second lens 372) can move by just the amount of play in the direction orthogonal to the direction of the optical axis with respect to the base frame 100A, and movement in the direction of the optical axis is restrained. By moving the holding frame 70 in the direction orthogonal to the direction of the optical axis, the position of the second lens is adjusted. This positioning adjustment work may be carried out by, for example, operating a movement apparatus for moving the jig in three dimensions.

When the positioning adjustment of the second lens is complete, the holding frame 70 is fixed to the base frame 100A. Specifically, concave portions 75 in which adhesive material is filled are formed at the side faces of the engaging portions 71 (the side faces adjacent to the catching portions 101), and the engaging portions 71 and the catching portions 101 are adhered fixedly by filling the concave portions 75 with adhesive material.

As described above, in this embodiment, the second lens 372 is attached to the base frame though the holding frame 70. By doing this, the lenses constituting the superimposing lens system can be readily attached to the base frame.

Also, in this embodiment, two engaging portions 71 and two catching portions 101 for guiding the holding frame to the base frame are provided on the holding frame 70 and the base frame 100A, respectively, and a predetermined gap (play) is formed between the engaging portions 71 and the catching portions 101. The position for the direction orthogonal to the optical axis of the holding frame 70 is adjusted within the predetermined gap, and the position for the direction of the optical axis of the holding frame 70 is determined by the two catching portions 101 and the two long holes 102.

By employing such a construction, the position for the direction orthogonal to the optical axis of the lens 372 constituting the superimposing lens system 370 can be adjusted. So when there is a misalignment between the available display area of the liquid crystal panels and the lighting area of the illumination optical system in the vertical direction or the horizontal direction, it is possible to align the lighting area of the illumination optical system to the available display area of the liquid crystal panels, and as a result, the optical efficiency is increased.

In this embodiment, the holding frame 70 is applied to the second lens 372 constituting the superimposing lens system 370, but it may be similarly applied to the first lens 371 as well. Alternatively, an elastic member may be used as in the first embodiment to directly mount the first lens 371 on the base frame 100. In general, the holding frame is preferably applied to at least the second lens 372 provided at the position furthest from the light source. This is because the second lens 372 provided at the furthest position from the light source has the function of ultimately determining the formation position of the lighting area of the illumination optical system. By doing this, the lighting area of the illumination optical system may be aligned relatively easily with the available display area of the liquid crystal panels.

The present invention is not restricted to the above embodiment or its modifications, but there may be many other modifications, changes, and alterations without departing from the scope or spirit of the main characteristics of the present invention. Some examples of possible modification are given below.

(1) In the above embodiments, a dichroic prism in which two types of color selecting faces are formed along the adhesion faces of four rectangular prisms is used as a color light combining optical system; but instead, a combination of dichroic prisms in which one type of color selecting face is formed, polarizing beam splitters and the like may be used. Also, a light selecting face may be provided inside a substantially hexahedral translucent box, and a dichroic prism formed by filling the inside of the box with a liquid.

(2) In the above embodiments, the present invention is applied to a projector using transmissive type liquid crystal panels, but the present invention may be applied to a projector using reflective type liquid crystal panels as well.

Also, instead of liquid crystal panels, a micromirror type light modulation device may be used. In general, a light modulation device will modulate light provided by the illumination optical system according to image information.

(3) In the above embodiments, the present invention is applied to a projector displaying a color image, but the present invention may be applied to a projector displaying a monochrome image as well.

(4) For the projector, there are both a forward projecting display apparatus which projects an image from the direction of the observation and a backward projecting display apparatus which projects an image in the reverse direction of observation; the present invention may be applied to either.

INDUSTRIAL APPLICABILITY

The present invention may be applied to a variety of apparatuses such as an illumination optical system and a projector using that illumination optical system.

What is claimed is:

1. An illumination optical system for illuminating a predetermined illumination area comprising:
   a light source;
   a lens array including a plurality of small lenses for dividing light emitted from the light source into a plurality of light bundles;
   a superimposing lens system for superimposing the plurality of light bundles on the predetermined illumination area; and
   a base frame that mounts a plurality of optical components disposed at least on a light path from the lens array to the superimposing lens system, the base frame including a positioning section for positioning at least the superimposing lens system, and is capable of being used in common for another illumination optical system,
   wherein the superimposing lens system comprises at least two lenses including a first lens and a second lens, the first lens being provided at a position nearest to the light source and mainly determining an F-number of the illumination optical system, and the second lens being provided at a position furthest form the light source and mainly determining a magnification of the illumination optical system,
   and wherein the F-number and the magnification of the illumination optical system are capable of being changed by replacing the first and second lenses with other lenses having different focal lengths, without changing the position of the first and second lenses in the base frame.

2. The illumination optical system according to claim 1, wherein the superimposing lens system consists of the two lenses.

3. The illumination optical system according to claim 2, further comprising:
   a mirror for bending a travel direction of light, the mirror disposed between the two lenses.

4. The illumination optical system according to claim 1, wherein
   each lens constituting the superimposing lens system is attached to the base frame using an elastic member.

5. The illumination optical system according to claim 1, wherein at least one of the plurality of lenses constituting the superimposing lens system is attached to the base frame using an elastic member.

6. The illumination optical system according to claim 1, wherein
   at least one of the plurality of lenses constituting the superimposing lens system is attached to the base frame through a holding frame for holding the lens.

7. The illumination optical system according to claim 6, wherein
   a first guiding portion and a second guiding portion for guiding the holding frame to the base frame are provided in the holding frame and the base frame respectively;
   a predetermined gap is formed between the two guiding portions; and
   a position for a direction orthogonal to an optical axis of the holding frame is adjusted within the predetermined gap, and a position for a direction of the optical axis of the holding frame is determined by the positioning section.

8. The illumination optical system according to claim 7, wherein
   the at least one lens attached to the base frame through the holding frame includes the second lens.

9. The illumination optical system according to claim 1, further comprising:
   a polarization conversion element, provided between the lens array and the superimposing lens system, for aligning a polarization direction of light emitted from the illumination optical system.

10. A projector comprising:
    an illumination optical system;
    a light modulation device for modulating light given from the illumination optical system according to image information;
    a projection optical system for projecting the modulated light; and
    a base frame for mounting a plurality of optical components disposed on a light path from the optical illumination system to the projection optical system,
    wherein the illumination optical system comprises:
    a light source;
    a lens array including a plurality of small lenses for dividing light emitted from the light source into a plurality of light bundles; and
    a superimposing lens system for superimposing the plurality of light bundles on the light modulation device,
    wherein the base frame includes a positioning section for positioning at least the superimposing lens system and is capable of being used in common for another illumination optical system; and
    the superimposing lens system comprises at least two lenses including a first lens and a second lens; the first lens being provided at a position nearest to the light source and mainly determining an F-number of the illumination optical system, and the second lens being provided at a position furthest from the light source and mainly determining a magnification of the illumination optical system,
    and wherein the F-number and the magnification of the illumination optical system are capable of being changed by replacing the first and second lenses with other lenses having different focal lengths, without changing the positions of the first and second lenses in the base frame.

11. The projector according to claim 10, wherein the superimposing lens system consists of the two lenses.

12. The projector according to claim 11, further comprising:

a mirror for bending a travel direction of light, the mirror disposed between the two lenses.

13. The projector according to claim 12, wherein each lens constituting the superimposing lens system is attached to the base frame using an elastic member.

14. The projector according to claim 10, wherein at least one of the plurality of lenses constituting the superimposing lens system is attached to the base frame using an elastic member.

15. The projector according to claim 10, wherein at least one of the plurality of lenses constituting the superimposing lens system is attached to the base frame through a holding frame for holding the lens.

16. The projector according to claim 15, wherein a first guiding portion and a second guiding portion for guiding the holding frame to the base frame are provided in the holding frame and the base frame respectively;

a predetermined gap is formed between the two guiding portions; and a position for a direction orthogonal to an optical axis of the holding frame is adjusted within the predetermined gap, and a position for a direction of the optical axis of the holding frame is determined by the positioning section.

17. The projector according to claim 16, wherein the at least one lens attached to the base frame through the holding frame includes the second lens.

18. The projector according to claim 10, further comprising:

a polarization conversion element, provided between the lens array and the superimposing lens system, for aligning a polarization direction of light emitted from the illumination optical system.

19. The projector according to claim 10, wherein the light modulation device is a liquid crystal panel.

20. An illumination optical system for illuminating a predetermined illumination area comprising:

a light source;

a lens array including a plurality of small lenses for dividing light emitted from the light source into a plurality of light bundles;

a superimposing lens system that includes a plurality of lenses and superimposes the plurality of light bundles on the predetermined illumination area; and a base frame that disposes the plurality of lenses so as to be replaceable with other lenses having different focal lengths and is capable of being used in common for another illumination optical system, wherein the F-number and the magnification of the illumination optical system are capable of being changed by replacing the plurality of lenses with other lenses having different focal lengths, without changing the positions of the plurality of lenses in the base frame.

* * * * *